(12) United States Patent
Geurts et al.

(10) Patent No.: US 11,845,325 B2
(45) Date of Patent: Dec. 19, 2023

(54) METHOD FOR MOUNTING A PREFORMED SEAL ON A SUBSTRATE

(71) Applicant: Inalfa Roof Systems Group B.V., Oostrum (NL)

(72) Inventors: Stephan Paulus Jan Geurts, Belfeld (NL); Stefan Maria Josten, Rommerskirchen (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/526,677

(22) Filed: Nov. 15, 2021

(65) Prior Publication Data
US 2022/0153107 A1 May 19, 2022

(30) Foreign Application Priority Data
Nov. 18, 2020 (EP) .................................... 20208480

(51) Int. Cl.
*B29C 45/14* (2006.01)
*B60J 10/90* (2016.01)

(52) U.S. Cl.
CPC ......... *B60J 10/90* (2016.02); *B29C 45/14065* (2013.01); *B29C 45/14467* (2013.01); *B29C 2045/1454* (2013.01)

(58) Field of Classification Search
CPC ........ B29C 45/14065; B29C 45/14467; B29C 2045/1454
See application file for complete search history.

(56) References Cited

U.S. PATENT DOCUMENTS 4,925,511 A * 5/1990 Ikeda ....................... B60J 10/75
156/298
5,069,852 A * 12/1991 Leone ...................... B60J 10/70
264/239

(Continued)

FOREIGN PATENT DOCUMENTS

DE 102017121558 B3 3/2019
EP 0368817 A2 5/1990

OTHER PUBLICATIONS

European Search Report for corresponding European patent application No. 20208480.2 dated May 7, 2021.

(Continued)

*Primary Examiner* — Edmund H Lee
(74) *Attorney, Agent, or Firm* — Steven M. Koehler; Westman, Champlin & Koehler, P.A.

(57) ABSTRACT

A method for mounting a preformed seal on a substrate comprises the steps of providing the preformed seal at a predetermined position relative to the substrate, at least a part of the preformed seal being spaced at a distance from the substrate; arranging a mold in contact with the substrate and the preformed seal, wherein the mold holds the preformed seal at the predetermined position and wherein the mold, the substrate and the preformed seal delimit a mold cavity. Further, the method comprises at least partially filling the mold cavity with a solidifiable composition, wherein the solidifiable composition is in contact with the substrate and the preformed seal bridging the distance; and solidifying the solidifiable composition, whereby the solidifiable composition forms a molded part adhering to the preformed seal and to the substrate. The preformed seal and the solidifiable composition are configured to adhere to each other.

16 Claims, 7 Drawing Sheets

(56) References Cited

U.S. PATENT DOCUMENTS

| | | | | |
|---|---|---|---|---|
| 5,344,603 | A | * | 9/1994 | Jardin ...................... B60J 10/82 |
| | | | | 264/261 |
| 5,464,575 | A | * | 11/1995 | Jaffiol ................... B29C 70/763 |
| | | | | 264/277 |
| 5,705,113 | A | * | 1/1998 | Kane ..................... B29C 33/126 |
| | | | | 264/261 |
| 5,997,793 | A | * | 12/1999 | Lahnala ............ B29C 45/14377 |
| | | | | 264/261 |
| 6,099,779 | A | * | 8/2000 | Brandner ................. B60J 10/82 |
| | | | | 264/261 |
| 6,123,535 | A | | 9/2000 | Ash et al. |
| 6,495,082 | B1 | | 12/2002 | Ash et al. |
| 11,260,736 | B1 | * | 3/2022 | Stafievsky .............. B29C 70/76 |
| 2020/0269471 | A1 | | 8/2020 | Keller |

OTHER PUBLICATIONS

Office Action in corresponding European application No. 20208480.2 dated Jul. 26, 2023.

* cited by examiner

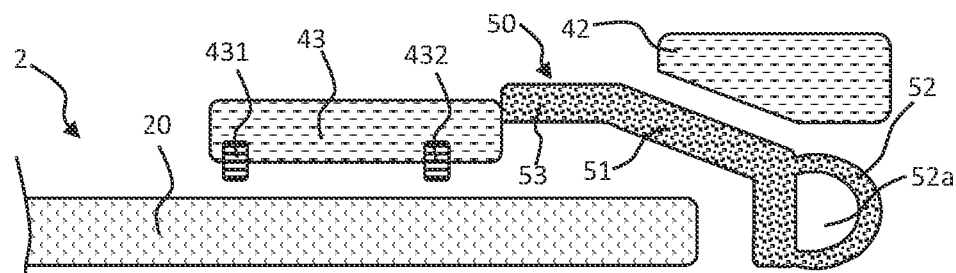
Fig. 5A
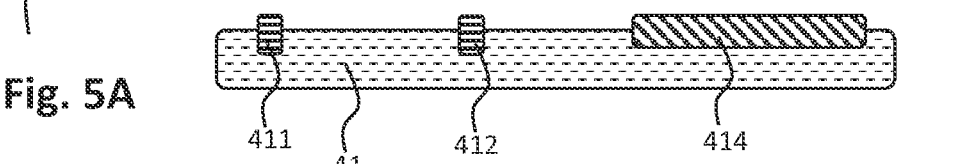
Fig. 5B
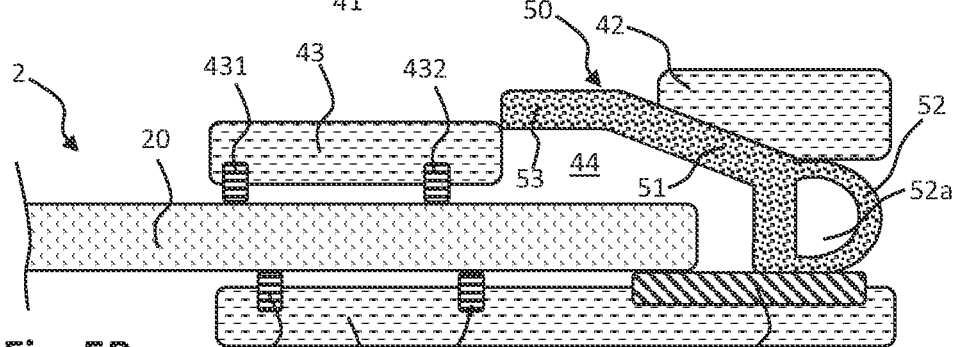
Fig. 5C
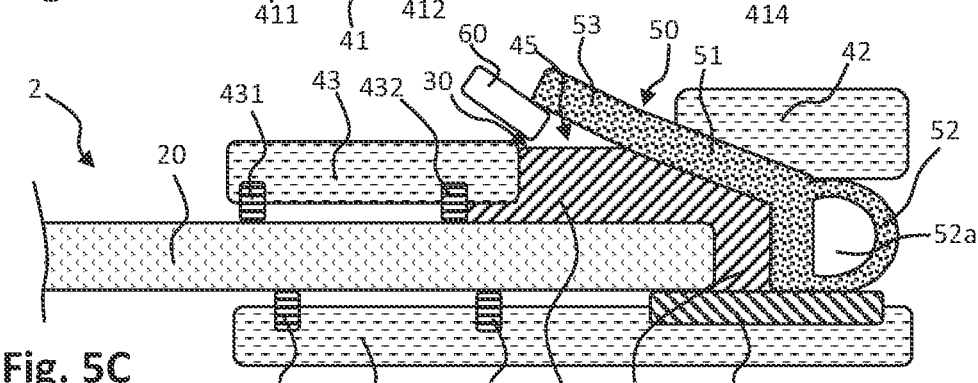
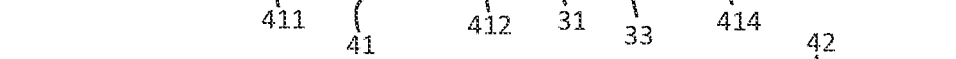
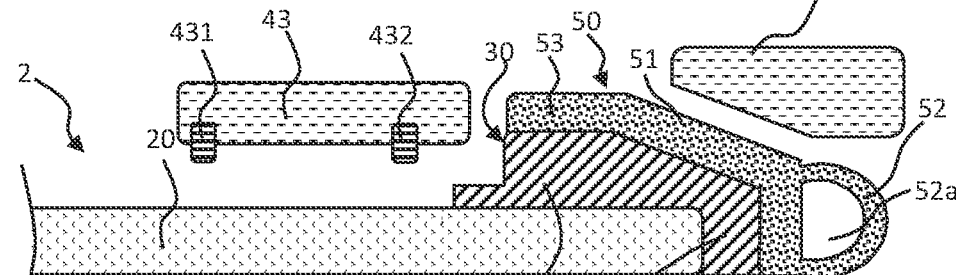
Fig. 5D
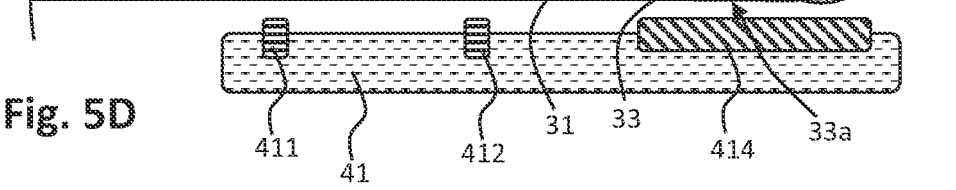

METHOD FOR MOUNTING A PREFORMED SEAL ON A SUBSTRATE

BACKGROUND

The discussion below is merely provided for general background information and is not intended to be used as an aid in determining the scope of the claimed subject matter.

The invention relates to providing a seal on a substrate, in particular a glass panel and to an assembly comprising the seal and the substrate. Further, the invention relates to an open-roof assembly comprising such an assembly and to a seal for use in the method and in the assembly.

For automotive purposes and in particular for use in an open-roof assembly like a sunroof, it is known to provide a seal in a peripheral or circumferential area of a panel of the open-roof assembly, e.g. a moveably arranged panel, which herein is also referred to as a closure member.

In a known assembly, the seal is provided by molding which is performed while an edge area along a circumference of the panel is encapsulated with a solidifiable composition, e.g. a curable polyurethane. In such a method, a mold is provided at the edge area and a cavity in the mold is filled with the solidifiable composition. The mold cavity has a shape corresponding to a desired seal shape. After solidification, e.g. curing, the mold is removed and a seal remains in the peripheral area. This method may be performed by a pressurized injection molding process, e.g. an RIM (reaction injection molding) process, or by an application at atmospheric pressure, e.g. a WST (window spray technology) process.

A disadvantage of the above method of providing the seal is the limitation in seal shape. In particular, the seal shape is limited to whole bodies without any hollow cavities, while in certain applications it may be preferred to use a bulb seal having a hollow cavity for providing an increased compressibility and adaptability, for example. Such bulb seals are easily manufactured by extrusion and are usually provided with a protrusion for mechanical coupling to support structure. Such mounting by mechanical coupling adds a manufacturing step and puts additional requirements on the panel and the encapsulation provided thereon.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, a method for mounting a preformed seal on a substrate is provided. The method comprises providing the substrate; providing the preformed seal at a predetermined position relative to the substrate, at least a part of the preformed seal being spaced at a distance from the substrate; arranging a mold, wherein the mold holds the preformed seal at the predetermined position and wherein the mold, the substrate and the preformed seal delimit a mold cavity; at least partially filling the mold cavity with a solidifiable composition, wherein the solidifiable composition is in contact with the substrate and the preformed seal bridging the distance; and solidifying the solidifiable composition, thereby the solidifiable composition forming a molded part adhering to the preformed seal and to the substrate. The preformed seal and the solidifiable composition are configured to adhere to each other. Thus, in a single manufacturing step, the preformed seal and a peripheral encapsulation or any other molded part may be provided.

A well-known and commonly used solidifiable composition is a composition comprising polyurethane, which may be applied in a liquid state under increased pressure or under atmospheric pressure and may then be cured to form a solid molded part. Still, polyurethane may have different compositions and corresponding properties.

A well-known and commonly used preformed seal comprises EPDM rubber and is formed by extrusion. Like polyurethane, EPDM rubber comprises a range of different compositions and may have different, respective properties. Moreover, not every combination of a specific polyurethane and a specific EPDM will chemically adhere to each other, at least not with a sufficient strength for automotive application. Therefore, the solidifiable composition and the preformed seal are configured to adhere to each other. Such adhesion may be provided as a chemical adhesion by suitable selection of a combination of the solidifiable composition and a seal composition. In other embodiments, a chemical adhesion may be promoted by use of a priming composition. Further, mechanical coupling may be promoted by providing a coupling protrusion on the preformed seal, wherein the coupling protrusion is embedded in the molded part, as described hereinafter in more detail.

In an embodiment of the method, the preformed seal is flexible. Thus, the preformed seal may be configured to be formed corresponding to the peripheral shape of the substrate or may be configured to provide sealing properties as desired for the specific application of the seal, for example. The flexibility may be controlled, however. For example, a preformed seal comprising EPDM may have a high flexibility, which flexibility may be decreased or at least controlled by embedding a more rigid and bendable element, such as a steel insert, for example.

In an embodiment of the method, the substrate comprises a glass panel and the preformed seal comprises a sealing section, wherein the sealing section is configured to provide a sealing function for sealing a gap between the glass panel and a structure on which the glass panel is configured to be arranged. In particular, such a structure may be a body of a vehicle and the glass panel may be a window or a roof panel. Such a roof panel may be a fixed panel or may be a moveably arranged panel. The sealing section may take any form, including any hollow structure, wherein the form is selected and manufactured in accordance with the intended application. Moreover, not only the form may be predetermined, other properties may be predetermined as well. For example, compressibility, resistance to wear, resistance to external conditions like rain and UV radiation, and other properties may have been taken into account during design and manufacturing of the preformed seal. As the seal is preformed, a larger freedom of design is obtained as compared to a seal which is formed by the molding process.

In an embodiment of the method, the preformed seal comprises a first surface and a second surface, wherein the second surface is opposite to the first surface. Further, in the step of arranging a mold, the first surface is arranged to face the mold cavity; in the step of filling the mold cavity, the solidifiable composition is brought into contact with the first surface; and in the step of solidifying, the first surface is adhered to the solidifiable composition. After solidification, the second surface is not in contact with the molded part. Thus, the second surface of the preformed seal forms an outer surface covering the molded part. In particular, a surface of a molded part may not be visually attractive. Use of a preformed seal covering the surface of the molded part may ease the requirements on an inner surface of the mold cavity as the surface of the molded part will be covered and not visible.

In an embodiment of the method, the preformed seal comprises a cover section. The cover section is configured to at least partially cover the mold cavity. In this embodiment, the step of filling the mold cavity comprises holding the cover section in a first position to thereby provide an opening to the mold cavity; providing the solidifiable composition through the opening; and positioning the cover section in a second position, wherein the cover section at least partially covers the mold cavity. This embodiment may be particularly relevant to a molding process under atmospheric pressure as the cover section may be simply partially or completely lifted to provide an opening through which the solidifiable composition may be provided into the mold cavity. Of course, in a specific embodiment, a similar cover section may be used in combination with a pressurized injection method, taking into account the requirements on such a cover section to be able to withstand the pressure generated in the mold cavity.

In a particular embodiment of the method wherein a cover section is provided on the preformed seal, in the step of positioning the cover section in the second position, the cover section is brought into contact with the solidifiable composition. In a more particular embodiment, the cover section is brought into contact at a time that a chemical adhesion between the solidifiable composition and the cover section can occur. Thereto, it may be needed that the solidifiable composition has not started to solidify at its surface yet, for example.

In an embodiment of the method, the preformed seal comprises a handling protrusion, wherein in the step of arranging the mold comprises engaging the mold with the handling protrusion for holding the preformed seal in the predetermined position. The method further comprises a step of disengaging the mold and the preformed seal. In a particular embodiment, the disengagement is performed by disconnecting the handling protrusion from the preformed seal. Thus, the handling protrusion on the preformed seal enables to easily and accurately hold the preformed seal in its predetermined position during the process of molding.

Further embodiments may combine aspects of the above-mentioned embodiments.

In an aspect, an assembly comprising a substrate, a preformed seal and a molded part is provided. The molded part is adhered to the substrate and to the preformed seal, thereby adhering the substrate and the preformed seal to each other.

In an embodiment of the assembly, the substrate comprises a glass panel and the preformed seal comprises a sealing section. The sealing section is configured to provide a sealing function for sealing a gap between the glass panel and a structure on which the glass panel is configured to be arranged.

In an embodiment of the assembly, the seal element comprises a cover section, the cover section at least partially covering the molded part.

In an embodiment of the assembly, the preformed seal comprises a coupling protrusion, wherein the coupling protrusion extends into the molded part and provides a mechanical coupling between the preformed seal and the molded part. Such a mechanical coupling may assist in increasing an adhesion strength.

In an aspect, a roof assembly is provided wherein the open roof assembly comprises an embodiment of the above-mentioned assembly. Such a roof assembly may be configured to be mounted as a part of a roof of a vehicle, for example.

In a further aspect, a preformed seal is provided wherein the preformed seal is configured for use in an embodiment of the above-described method or is configured to be comprised in an embodiment of the above-described assembly. Thereto, the preformed seal is configured to adhere to a predetermined solidifiable composition, preferably a predetermined curable polyurethane composition.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

BRIEF DESCRIPTION OF THE DRAWINGS

FIGS. 5A-5D illustrate a method of manufacturing a second embodiment of a substrate with a preformed seal;

DETAILED DESCRIPTION OF THE ILLUSTRATIVE EMBODIMENTS

Figure 1A:
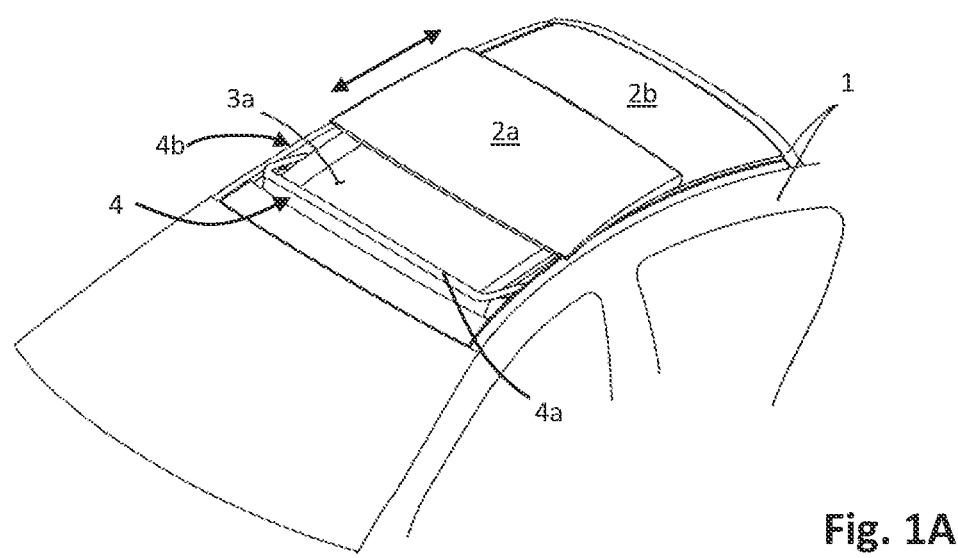
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
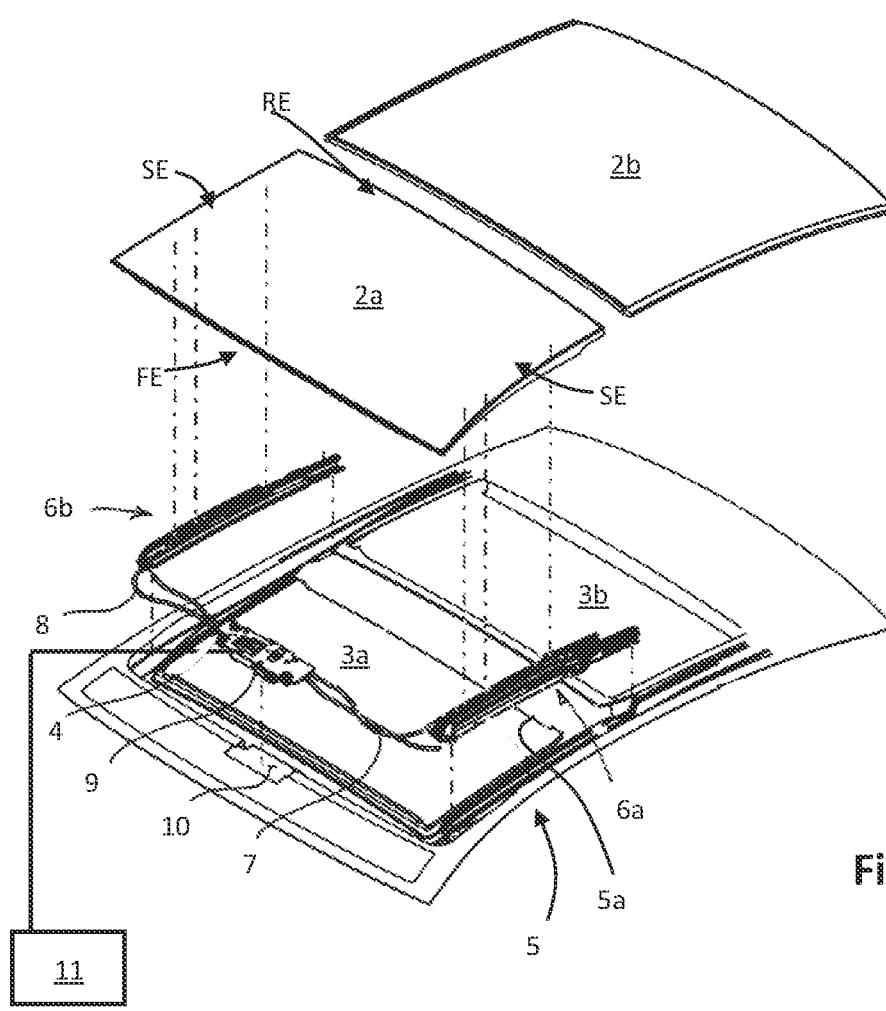
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly, having a middle beam 12 of the frame 5 between the openings 3a, 3b. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and an electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

A control module 11 is schematically illustrated and is operatively coupled to the electric motor 9. The control module 11 may be any kind of processing module, either a software controlled processing module or a dedicated processing module, like an ASIC, which are both well known to those skilled in the art. The control module 11 may be a stand-alone control module or it may be operatively connected to another control module, like a multipurpose, generic vehicle control module. In yet another embodiment, the control module 11 may be embedded in or be part of such a generic vehicle control module. Essentially, the control module 11 may be embodied by any control module suitable for, capable of and configured for performing operation of the electric motor 9 and thus the moveable roof assembly.

Figure 2A:
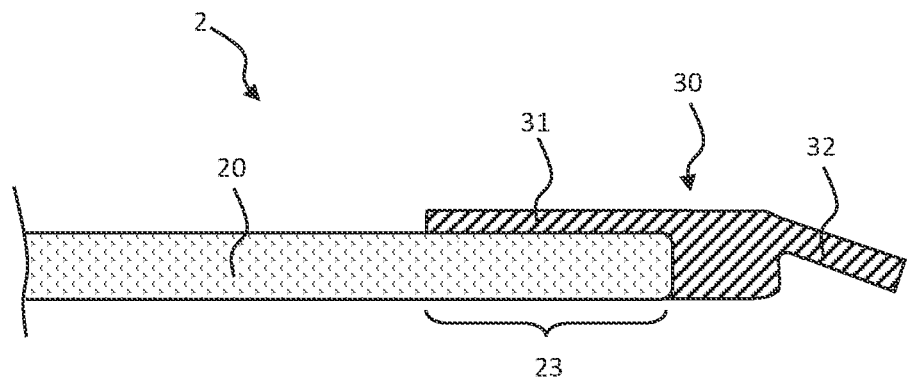
FIG. 2A shows a cross-section of a prior art embodiment of a substrate with a seal.

FIG. 2A shows a prior art assembly 2 comprising a substrate, in particular a glass panel 20 and a molded part 30. The assembly 2 may be used as a panel for a vehicle roof, e.g. a moveable closure member 2a or a fixed panel 2b as illustrated in FIGS. 1A and 1B, for example. For use in a vehicle roof, it is not required that the assembly comprises a glass panel 20, but may comprises any other suitable and desirable substrate. For example, a transparent plastic substrate may be used instead. In another embodiment, the substrate may be opaque or semi-transparent and be formed of glass, plastics or metal, for example.

The molded part 30 comprises a main section 31 and a sealing section 32. The main section 31 is adhered to a peripheral section 23 of the glass panel 20. The peripheral section 23 is adjacent to an edge of the glass panel 20. In this embodiment, the main section 31 covers a part of the peripheral section 23, for example to cover parts in the vehicle roof that are arranged below such peripheral section 23. However, it is not required that such a peripheral section 23 is fully covered. Essential is that the molded part 30 is sufficiently adhered to the substrate, in casu the glass panel 20.

The sealing section 32 is a flexible portion of the molded part 30, extending from the peripheral section 23 outward. When the glass panel 20 is mounted in a vehicle roof, the flexible sealing section 32 may come in contact with a part of the vehicle roof and thus close or cover such part, preventing air flow, water ingress, noise or any other similarly undesirable phenomena, as well known in the art.

Figure 2B:
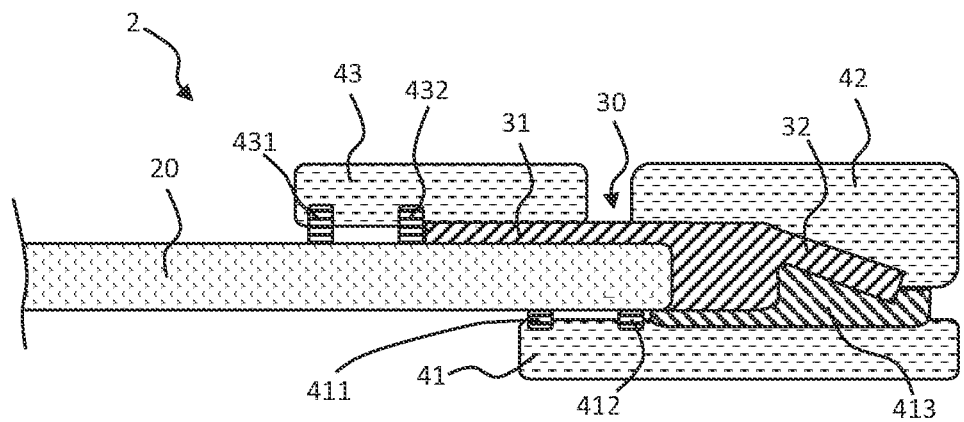
FIG. 2B illustrates a method of manufacturing the embodiment of FIG. 2A.

FIG. 2B illustrates a prior art method of providing the prior art seal of FIG. 2A. In this method, a liquid solidifiable composition is provided into a mold cavity at atmospheric pressure, so the mold cavity may be an open cavity, alleviating the requirements on a mold. An embodiment of such a method is known as Window Spray Technology (WST). Still, it is noted that a similar seal may be provided with a molding process in which the liquid composition is provided in a mold cavity at an increased pressure, e.g. a Reaction Injection Molding (RIM) process.

In the illustrated embodiment of the method, a first mold part 41, a second mold part 42 and a third mold part 43 are arranged such to form a mold cavity. The first mold part 41 comprises a first support element 411, a second support element 412 and a mold shaping element 413. The mold shaping element 413 is formed having an inverse shape of a desired shape of the molded part 30. Further, a material and surface finish of the mold shaping element 413 may be selected in accordance with a desired surface finish of the molded part 30. For example, it is known that the mold shaping element 413 comprises a silicon rubber, providing a high quality surface finish for the molded part 30.

The second mold part 42 is illustrated as a single body. Still, in practice, the second mold part 42 may comprise multiple elements. For example, a further mold shaping element similar to the mold shaping element 413 may be arranged to shape the molded part 30 and/or to provide a desired surface finish. The third mold part 43 comprises a third support element 431 and a fourth support element 432. The four support elements 411, 412, 431 and 432 are supported on the glass panel 20, arranging the first and third mold parts 41, 43 relative to the glass panel 20. The second mold part 42 may be arranged on and positioned relative to the first mold part 41, for example. Thus, a mold cavity is formed, wherein the mold cavity is delimited by the glass panel 20, the mold shaping element 413, the second mold part 42, the third mold part 43 and the fourth support element 432. An opening to the mold cavity is provided between the second and the third mold parts 42, 43. Through the opening, the liquid solidifiable composition may be inserted into the mold cavity. In the mold cavity, the solidifiable composition solidifies to form the molded part 30.

The molded part 30 may be formed of any suitable solidifiable composition, wherein the molded part 30 is adhered to the glass panel 20 upon molding. Solidification may comprise solidification by cooling, thermal or radiative curing, hardening, vulcanization, or any other suitable and known method. In an embodiment, the composition may be comprised of two or more components that are brought together in the mold cavity for chemical, hardening reaction. A person skilled in the art is known with many compositions and methods for solidifying a liquid composition and is capable of selecting a suitable composition for use in the illustrated and described application. After solidification, the first, second and third mold parts 41, 42, 43 are removed.

Figure 3:
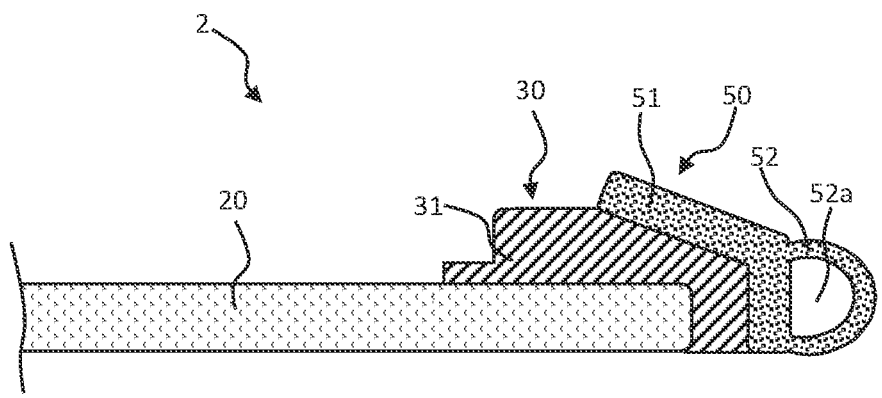
FIG. 3 shows a cross-section of a first embodiment of a substrate with a preformed seal.

FIG. 3 illustrates a first embodiment of an assembly 2 comprising a glass panel 20, a molded part 30 and a preformed seal 50. As described in respect of FIG. 2A, the glass panel 20 may be any other suitable and desired kind of substrate.

In this embodiment, the preformed seal 50 comprises a central section 51 and a sealing section 52, wherein a hollow cavity 52a is provided for controlling a flexibility of the sealing section 52, for example. Such a shape of the sealing section 52 with a hollow cavity 52a is not obtainable through the above-described prior art method. Still, the present invention is not limited to any kind of particular shape or function of the sealing section 52.

The central section 51 is adhered to the glass panel 20 through the molded part 30 comprising the main section 31. So, in this embodiment, the molded part 30 adheres to the glass panel 20 and to the preformed seal 50. Thereto, a suitable solidifiable composition may be selected, a suitable composition of the preformed seal may be selected and/or a priming composition may be provided between the molded part 30 and the preformed seal 50 and/or between the molded part 30 and the glass panel 20. Commonly, the molded part 30 may comprise a polyurethane (PU) composition and the preformed seal 50 may comprise an ethylene propylene diene monomer rubber (EPDM rubber) composition. Both PU composition and EPDM composition encompass a large range of compositions; some combinations of PU and EPDM may have a weak adhesion, while other combinations may exhibit a strong adhesion. A person skilled in the art is enabled to identify a suitable combination of such PU and EPDM or to identify any other suitable compositions, optionally supported by a priming composition, that exhibits sufficient adhesion strength for use in the assembly 2, e.g. for use in a vehicle roof.

The preformed seal 50 may be formed by extrusion, for example. Through extrusion, at a low cost, an elongated plastic rubber seal element may be formed in a wide variety of cross-sectional shapes. Forming the sealing section 52 by extrusion instead of molding may reduce costs, while increasing a freedom of design. Still, the preformed seal 50 may be manufactured by any other suitable method. The present invention is not limited to any particular method of manufacturing the preformed seal 50.

FIGS. 4A-4D illustrate a method for obtaining the first embodiment of FIG. 3. In the method, the first, second and third mold parts 41, 42, 43 are provided to form a mold cavity. Compared to the prior art method as illustrated in and described in relation to FIG. 2B, the first mold part 41 does not comprise the mold shaping element 413. Instead, a fifth support element 414 is provided. The requirements on the fifth support element 414 may be reduced compared to the requirements on the mold shaping element 413.

In this particular embodiment, the second mold part 42 is provided only to support the central section 51 of the preformed seal 50. Hence, requirements on the second mold part 42 may be alleviated.

Figure 4A:
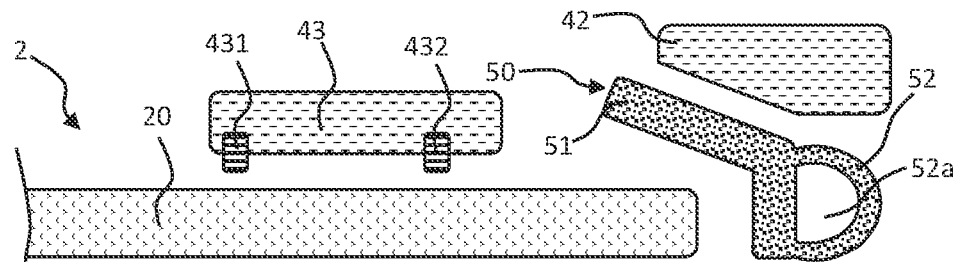
FIGS. 4A-4D illustrate a method of manufacturing the first embodiment of FIG. 3.
Figure 4B:
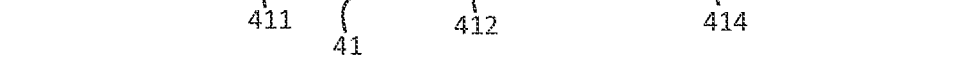

As illustrated in FIG. 4B, the first, second and third mold parts 41, 42, 43 as well as the glass panel 20 and the preformed seal 50 are positioned relative to each other to form a mold cavity 44 having an fill opening 45, wherein the mold cavity 44 is delimited by the glass panel 20, the fifth support element 414 of the first mold part 41, the preformed seal 50, the third mold part 43 and the fourth support element 432.

The preformed seal 50 is arranged between the first mold part 41, in particular the fifth support element 414, and the second mold part 42. The preformed seal 50 may be pressed slightly to ensure a liquid tight transition between the preformed seal 50 and the fifth support element 414 to prevent leakage of the solidifiable composition when it is introduced in the mold cavity 44.

Figure 4C:
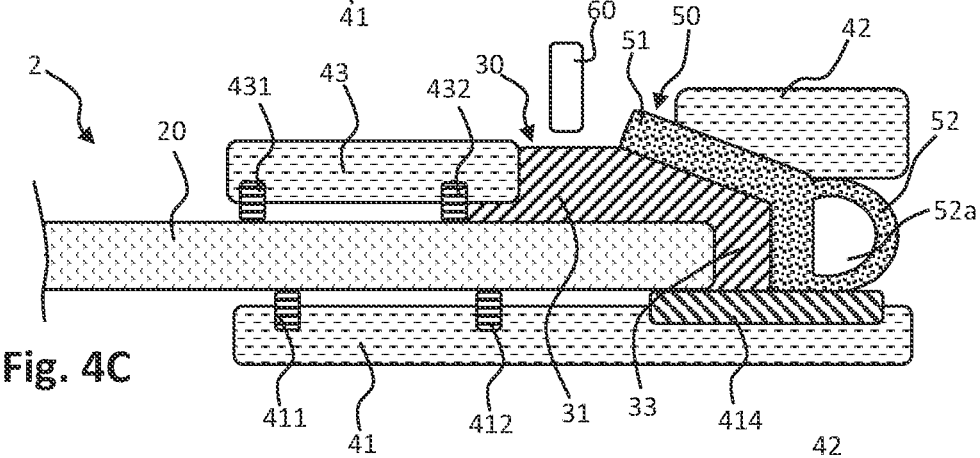

In a next step and as illustrated in FIG. 4C, the solidifiable composition is provided in the mold cavity 44 through a nozzle 60. In this particular embodiment, the mold cavity 44, the solidifiable composition is at atmospheric pressure. In case a pressurized method is applied, the requirements on the mold parts will be different. A person skilled in the art is enabled to provide a suitable mold for such a method, wherein special attention may be needed to prevent that the preformed seal 50 is compressed during molding to the extent that the preformed seal 50 loses its desired shape, flexibility and/or compressibility.

Once provided in the mold cavity 44, the solidifiable composition may solidify to form the molded part 30. In the illustrated embodiment, the molded part 30 comprises the central section 31 and a seal supporting section 33.

Figure 4D:
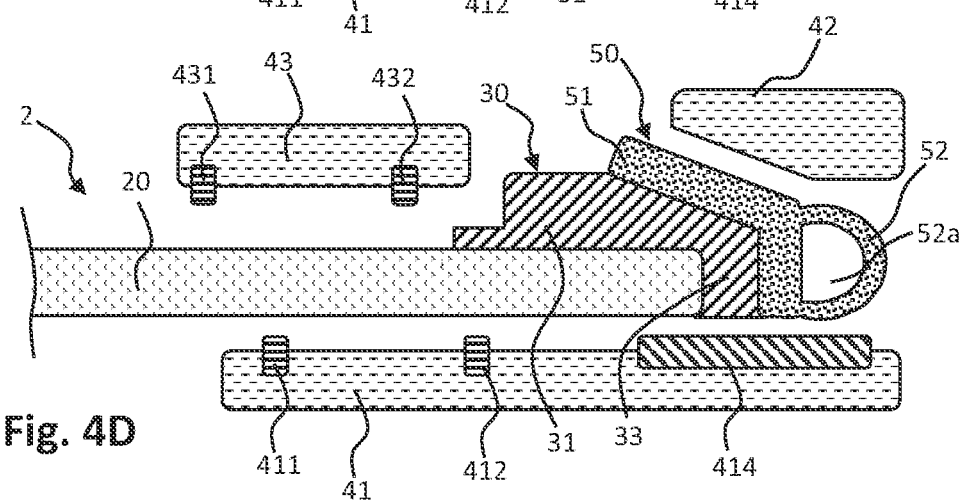

FIG. 4D illustrates the removal of the mold parts 41, 42, 43 and leaving the first embodiment of FIG. 3.

FIGS. 5A-5D illustrate a method essentially similar to the method of FIGS. 4A-4D with respect to the processing steps involved. In the illustrated method, a second embodiment of the assembly 2 is provided. In this second embodiment, the preformed seal 50 is provided with the central section 51, the sealing section 52 and a cover section 53. The cover section 53 is arranged at the fill opening 45 shown in FIG. 4B, through which opening the liquid solidifiable composition is provided into the mold cavity 44. In the embodiment of FIGS. 5A-5D, the three mold parts 41, 42, 43 are provided and arranged (FIGS. 5A and 5B), wherein the cover section 53 closes the gap between the second and the third mold parts 42, 43. In another embodiment, the cover section 53 may only partially cover the gap, as apparent to those skilled in the art.

In a next processing step illustrated in FIG. 5C, an injector nozzle 60 is arranged between the third mold part 43 and the cover section 53 by lifting the cover section 53. Thereto, the cover section 53 may be flexible or a hinge section may be provided in the preformed seal 50 to allow the cover section 53 to be lifted. The injector nozzle 60 injects the solidifiable composition which solidifies in the mold cavity 44 to form the molded part 30. As illustrated in FIG. 5D, the three mold parts 41, 42, 43 may then be removed.

In the second embodiment, after injection of the solidifiable composition, the cover section 53 is released to cover the solidifiable composition. Depending on the properties of the cover section 53, the properties of the solidifiable composition, in particular its properties related to solidification, level of filling of the mold cavity and processing properties, the cover section 53 may be arranged on a surface of the molded part 30. The cover section 53 may adhere or may not adhere to the molded part 30. A person skilled in the art is enabled to select suitable properties for the different elements involved and for the processing steps to achieve adhesion, or not, in accordance with a desired adhesion result.

The cover section 53 may be provided to cover the surface of the molded part 30 at the fill opening 45 as this surface may have a less aesthetically appealing surface finish compared to other visible parts of the surface of the molded part 30. For example, a surface section 33a of the seal supporting section 33 of the molded part 30 is visible. A finish of the surface section 33a is defined and controlled by the fifth supporting element 414. As described hereinabove, the surface finish may be suitably defined and controlled by such a mold cavity surface. At the location of the injector nozzle 60 during injection, the surface finish cannot be controlled and a less appealing surface finish can result. In this embodiment, a defined and controlled visible surface finish is obtained by covering the surface of the molded part 30 with the cover section 53 having a preformed and well-defined surface finish.

FIGS. 6A-6D illustrate a method essentially similar to the method of FIGS. 5A-5D with respect to the processing steps involved. In the embodiment of FIGS. 6A-6D, handling of the preformed seal 50 is eased.

Figure 6A:
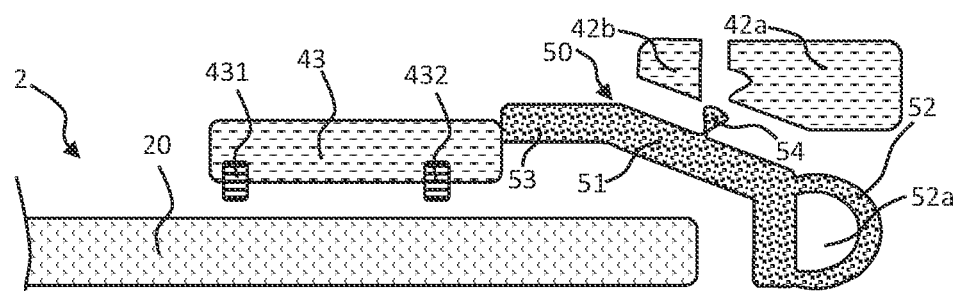
FIGS. 6A-6D illustrate a method of manufacturing a third embodiment of a substrate with a preformed seal.

As illustrated in FIG. 6A, the preformed seal 50 is provided with a handling protrusion 54 which, in this embodiment, extends from the central section 51. The preformed seal 50 may, of course, be provided with more than one handling protrusion or the handling protrusion 54 may be positioned at another part of the preformed seal 50 in accordance with processing requirements, mold design or visual appearance after processing, for example.

Further, the second mold part 42 comprises a first sub-part 42a and a second sub-part 42b.

Figure 6B:
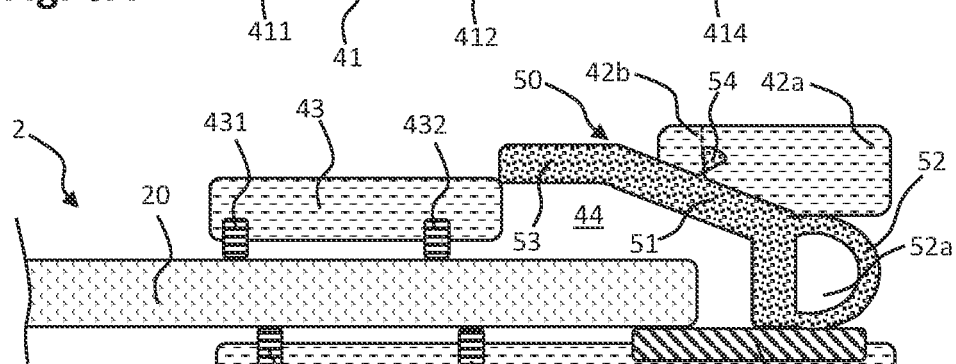

FIG. 6B illustrates the arrangement of the mold parts 41, 42, 43, the glass panel 20 and the preformed seal 50, wherein the handling protrusion 54 is clamped between the first sub-part 42a and the second sub-part 42b of the second mold part 42. Thus, the second mold part 42 is configured to hold the preformed seal 50 in position.

Figure 6C:
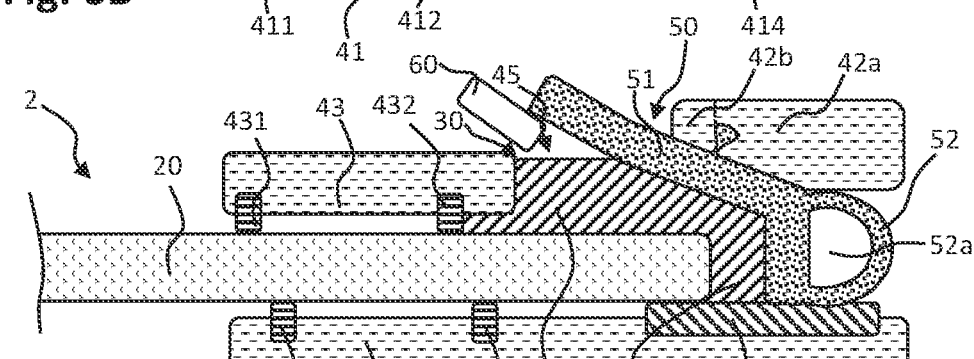
Figure 6D:
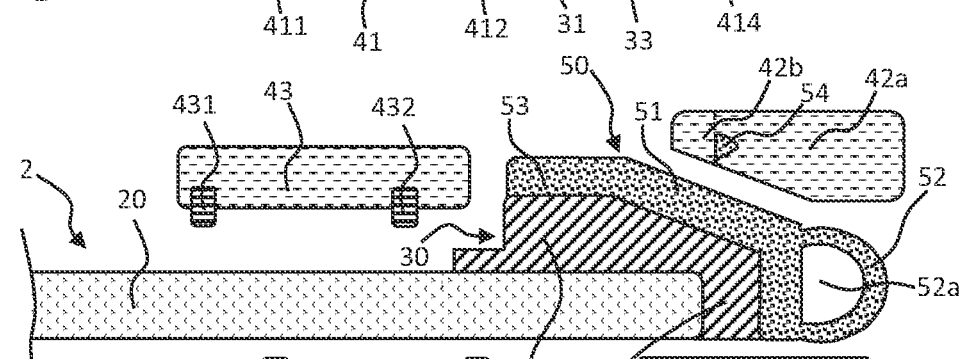

After forming of the molded part 30 as illustrated in FIG. 6C, the three mold parts 41, 42, 43 are removed as illustrated in FIG. 6D. When removing the second mold part 42, the handling protrusion 54 may be held and the handling protrusion 54 may be disconnected from the preformed seal 50. Thereto, the second mold part 42 may be disengaged in a predetermined way. For example, a predetermined sliding movement may be employed. Optionally, a cutting device may be employed. In another embodiment, the handling protrusion 54 may be disengaged by the second mold part 42 and, thereafter, the handling protrusion 54 is disconnected by a separate tool like a cutting device. In yet another embodiment, the handling protrusion 54 may remain on the preformed seal 50, for example if it is not visible after further assembly of the final product or if it is used for another function, or the like.

A suitable shape and position of the handling protrusion 54 may be freely selected by the skilled person. For example, as illustrated, the handling protrusion 54 may have a small-width (in the illustrated cross-sectional view) connection portion at the transition to the central section 51 such that upon disconnection only a minor or no trace is left at the external surface of the central section 51. On the other hand, if a stronger holding force is required during processing, a large-width (in the illustrated cross-sectional view) connection portion, as apparent to those skilled in the art.

Figure 7A:
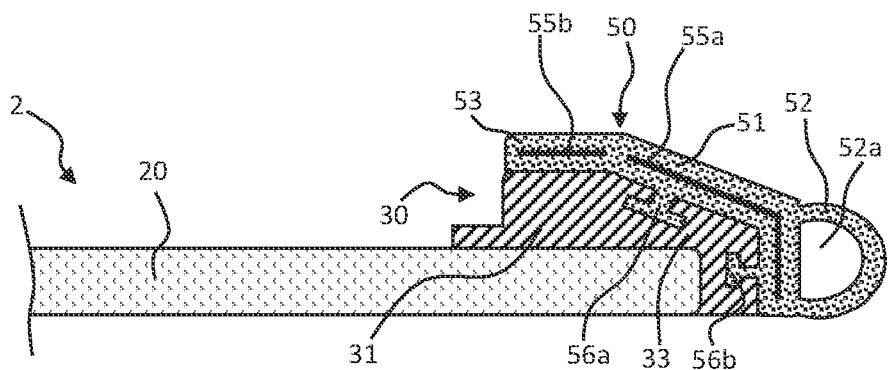
FIG. 7A shows a cross-section of a fourth embodiment of a substrate with a preformed seal.

FIG. 7A illustrates a fourth embodiment of the assembly 2. In this fourth embodiment, the preformed seal 50 comprises a coupling protrusion. In particular, a first coupling protrusion 56a and a second coupling protrusion 56b. The coupling protrusions 56a, 56b are embedded in the molded part 30 upon molding and are shaped to be anchored in the molded part 30. Thus, the coupling protrusions 56a, 56b increase a mechanical coupling strength between the preformed seal 50 and the molded part 30. It is apparent that any suitable number of coupling protrusions and any suitable location and position of such coupling protrusions may be selected in accordance with technical requirements.

Further, in the fourth embodiment, the preformed seal 50 comprises a first and a second stiffening element 55a, 55b, respectively. For example, a stiffening element may comprise steel or another metal. In another embodiment, the stiffening element may comprise a plastics material. The stiffening elements 55a, 55b may improve a final shape and corresponding visual appearance or they may be provided for technical considerations such as strength, either for manufacturing reasons or for technical properties of the final assembly 2. In an embodiment, the stiffening element may extend into a coupling protrusion 56a, 56b or into the sealing section 52.

As apparent to those skilled in the art, the coupling protrusion(s) 56a, 56b and the stiffening element(s) 55a, 55b may be applied in combination as illustrated in FIG. 7A, but they may as well be applied separately, i.e. one without the other.

Figure 7B:
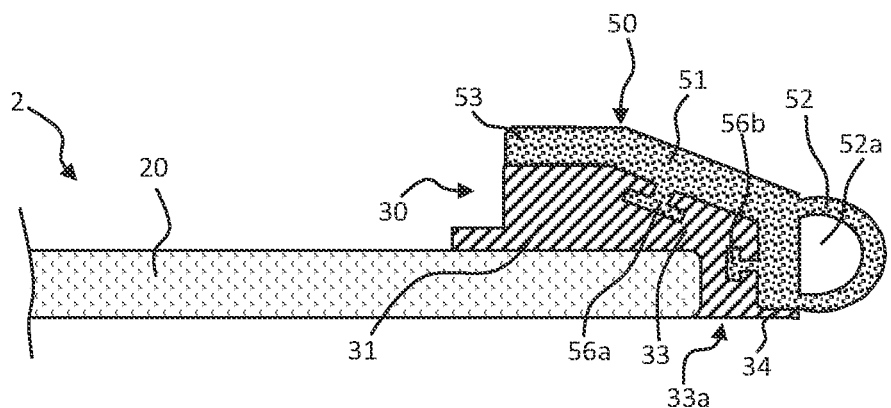
FIG. 7B shows a cross-section of a fifth embodiment of a substrate with a preformed seal.

FIG. 7B illustrates a fifth embodiment, wherein the molded part 30 comprises a surface extension section 34 extending the visible surface section 33a, covering the preformed seal 50. Thus, a transitional seam between the molded part 30 and the preformed seal 50 is removed from visibility.

Figure 7C:
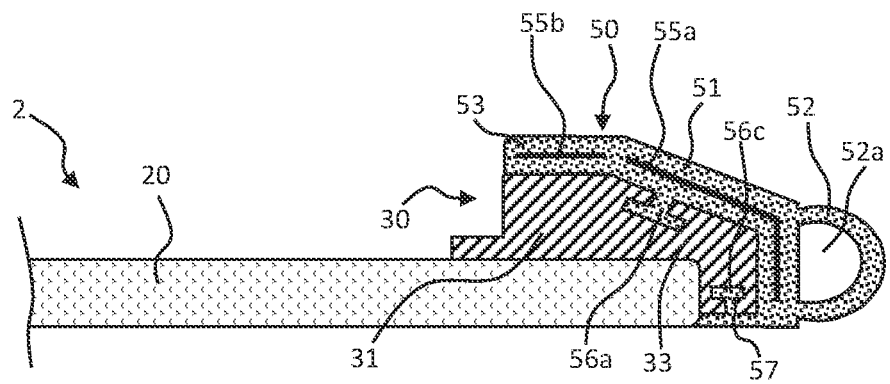
FIG. 7C shows a cross-section of a sixth embodiment of a substrate with a preformed seal.

For a same consideration, as illustrated in the sixth embodiment of FIG. 7C, the preformed seal 50 may be provided with an extension section 57, extending from the sealing section 52 to the glass panel 20 removing the molded part 30 from visibility. To ensure a strong and lasting coupling of the extension section 57 and the molded part 30, the coupling protrusion 56c may be provided at the extension section 57. Additionally or alternatively, a stiffening element may be arranged in the extension section 57.

Instead of mounting a preformed seal as described hereinabove, other kind of elements may be mounted at a periphery of the molded part 30 as well. For example, in the embodiment illustrated in FIGS. 8A-8D, an electronic component 80 may be mounted.

Figure 8A:
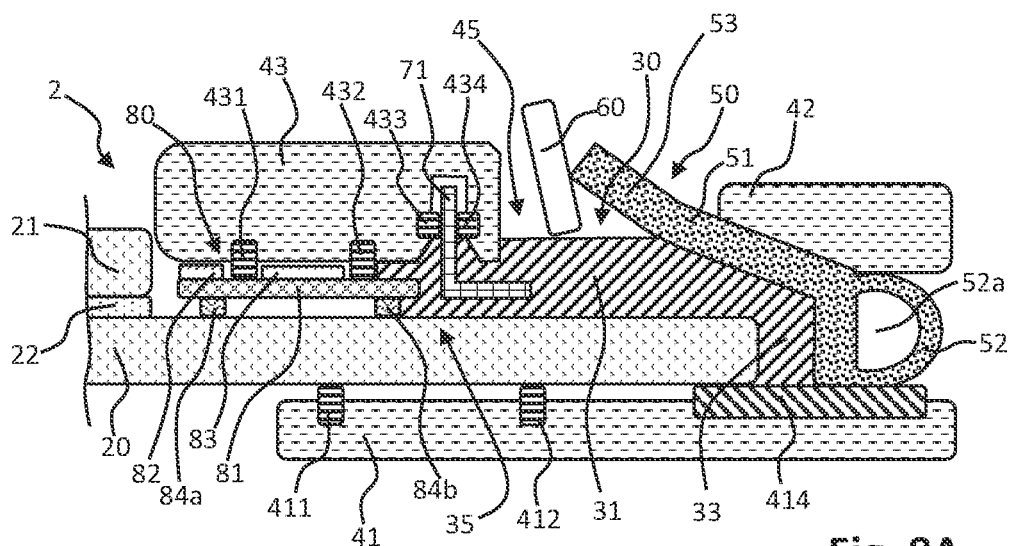
FIG. 8A illustrates a method of manufacturing a seventh embodiment of a substrate with a preformed seal.

Referring to FIG. 8A, the third mold part 43 may be configured to hold one or more elements to be mounted upon molding. A frame element 71 may be held and mounted by over-molding of a part of the frame element 71 as well known in the art. Such a frame element 71 is commonly made of steel and is preferably not in direct contact with the glass panel 20. Therefore, embedding in the molded part 30 is a suitable method to couple the glass panel 20 and the frame element 71. The frame element 71 may then be used to mount the glass panel 20 on a vehicle roof, for example.

The electronic component 80, as illustrated, comprises a printed circuit board (PCB) 81, an LED unit 82, additional electronic circuitry 83 and a first and a second PCB support 84a, 84b, respectively. In a central area, i.e. outside the peripheral area, a further glass sheet 21 is attached to the glass panel 20 by an interlayer 22, as known in the art. The LED unit 82 is to be arranged and mounted such that light emitted by the LED unit 82 enters the further glass sheet 21, in which the emitted light is conducted. Such light may be coupled out of the further glass sheet 21 to enter a vehicle compartment for ambient lighting of the compartment, which is known in the art and is not further elucidated herein.

The third and fourth support elements 431, 432 are positioned on the third mold part 43 such that they may engage the PCB 81 and apply pressure on the PCB 81 towards the glass panel 20. Thereby, on the one hand, the electronic component 80 is held in place during molding and, on the other hand, a liquid tight connection between the fourth support element 432 and the PCB 81 is provided and a liquid tight connection between the second PCB support 84b and the glass panel 20 is provided. Of course, additional well-known measures for obtaining a liquid tight connection may be applied as well.

Figure 8B:
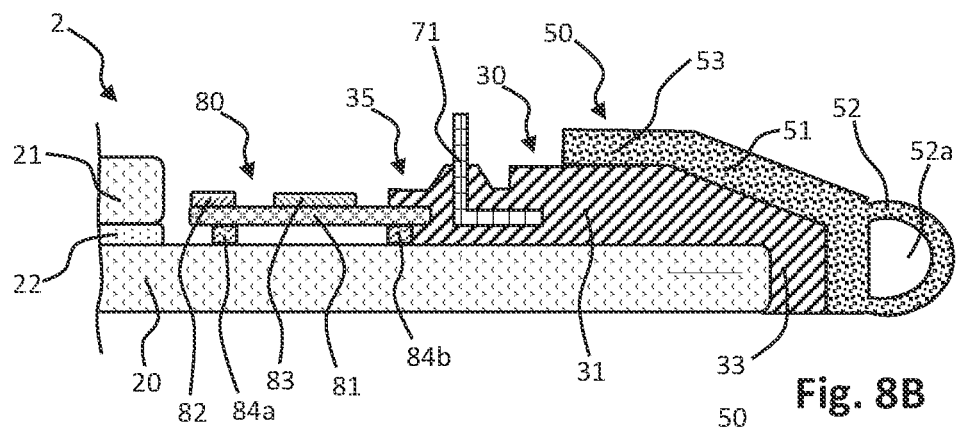
FIG. 8B shows a cross-section of the seventh embodiment of FIG. 8A.
Figure 8C:
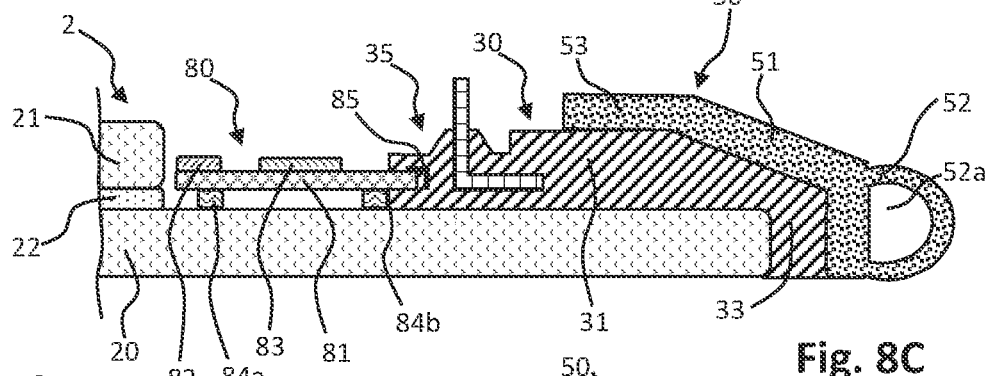
FIG. 8C shows a cross-section of an eighth embodiment of a substrate with a preformed seal.
Figure 8D:
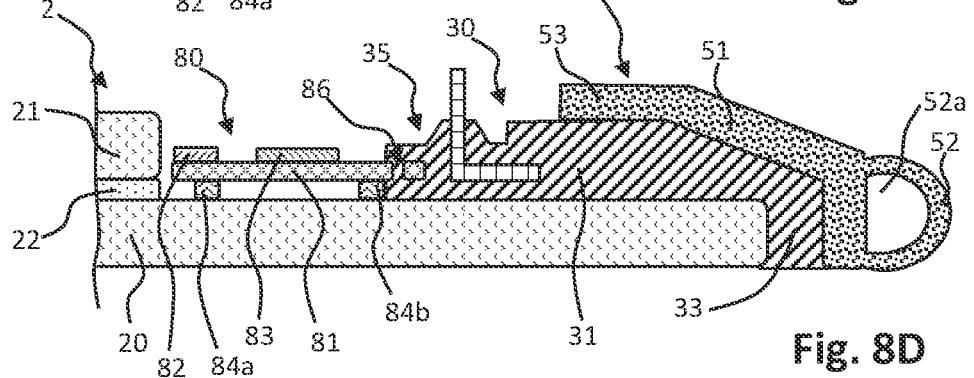
FIG. 8D shows a cross-section of a ninth embodiment of a substrate with a preformed seal.

After molding, an end portion of the PCB 81 is embedded in a component holding section 35 of the molded part 30. After disengagement of the mold parts 41, 42, 43, the seventh embodiment of the assembly 2 remains as illustrated in FIG. 8B.

As described hereinabove with respect the adhesion between the preformed seal 50 and the solidifiable composition of the molded part 30, an adhesion strength between the electronic component 80 and the solidifiable composition may be designed by selection of suitable materials, including application of e.g. a priming composition or other supporting compositions. In particular in combination with an electronic component, electrical properties may need to be taken into account as well.

Additionally or alternatively, mechanical properties may be configured to increase an adhesion strength. For example, as used in the eighth embodiment illustrated in FIG. 8C, an element coupling protrusion 85 may be used. Such an element coupling protrusion 85 may be a metal element coupled to the PCB 81 and embedded in the component holding section 35 of the molded part 30. In another example, as used in the ninth embodiment illustrated in FIG. 8d, an element coupling through hole 86 provided in the PCB 81 may be used. Such an element coupling through hole 86 may be embedded in the component holding section 35 of the molded part 30. As apparent to those skilled in the art, the through hole 86 may be replaced by one or more recesses, providing the same coupling function.

It is noted that in the seventh, eighth and ninth embodiment, the mounting of the electronic component 80 is illustrated in combination with the preformed seal 50 being mounted with the same molded part 30. It is contemplated that the mounting of the preformed seal 50 and the electronic component may be independent from each other. Hence, the electronic component 80 may be mounted without the preformed seal 50 being mounted or being mounted with a separate molded part 30. Further, the electronic component 80 may be mounted in combination with a molded sealing section 32 of the prior art as illustrated in FIGS. 2A and 2B.

Further, in the seventh, eighth and ninth embodiment, the PCB 81 of the electronic component 80 is embedded in the molded part 30 only at a relatively small end portion. In another embodiment, a larger part of the electronic component 80 may be embedded. In particular, if the composition of the molded part 30 is not electrically conductive, the electronic component 80 may be covered or embedded for a large part, for example protecting the electronic component 80 against moisture, mechanical impact, or the like.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A method for mounting a preformed seal on a substrate, the method comprising:
   providing the substrate;
   providing the preformed seal at a predetermined position relative to the substrate, at least a part of the preformed seal being spaced at a distance from the substrate;
   arranging a mold, wherein the mold holds the preformed seal at the predetermined position and wherein the mold, the substrate and the preformed seal delimit a mold cavity;
   at least partially filling the mold cavity with a solidifiable composition, wherein the solidifiable composition is in contact with the substrate and the preformed seal bridging the distance, wherein the preformed seal and the solidifiable composition are configured to adhere to each other, wherein the preformed seal comprises a cover section, and wherein at least partially filling the mold cavity with the solidifiable composition comprises:
      holding the cover section in a first position, thereby providing an opening to the mold cavity;
      providing the solidifiable composition through the opening; and
      positioning the cover section in a second position into contact with the solidifiable composition, and wherein the cover section at least partially covers the mold cavity; and
   solidifying the solidifiable composition, thereby the solidifiable composition forming a molded part adhering to the preformed seal and to the substrate.

2. The method according to claim 1, wherein the preformed seal is flexible.

3. The method according to claim 1, wherein the substrate comprises a glass panel and wherein the preformed seal comprises a sealing section, the sealing section being configured to provide a sealing function for sealing a gap between the glass panel and a structure on which the glass panel is configured to be arranged.

4. The method according to claim 1, wherein
the preformed seal comprises a first surface and a second surface, the second surface being opposite to the first surface and, wherein in arranging the mold, the first surface faces the mold cavity;
wherein at least partially filling the mold cavity with the solidifiable composition comprises the solidifiable composition being brought into contact with the first surface;
wherein solidifying the solidifiable composition comprises the first surface being adhered to the solidifiable composition; and
wherein after solidifying the solidifiable composition, the second surface is not in contact with the molded part.

5. The method according to claim 1, wherein the preformed seal comprises a handling protrusion, arranging the mold comprises engaging the mold with the handling protrusion for holding the preformed seal in the predetermined position; and wherein the method further comprises disengaging the mold and the preformed seal.

6. The method according to claim 5, wherein disengaging the mold and the preformed seal comprises disconnecting the handling protrusion from the preformed seal.

7. The method according to claim 1 wherein at least partially filling the mold cavity with the solidifiable composition comprises embedding a coupling protrusion in the solidifiable composition, the coupling protrusion being connected to the preformed seal.

8. The method according to claim 7, wherein embedding the coupling protrusion in the solidifiable composition comprising embedding an enlarged head of the coupling protrusion in the solidifiable composition, the enlarged head having a surface not delimiting the mold cavity.

9. The method according to claim 7, wherein embedding comprises a second coupling protrusion in the solidifiable composition spaced apart from the coupling protrusion.

10. The method according to claim 7, wherein the coupling protrusion is connected to a side of the preformed seal delimiting the mold cavity.

11. The method according to claim 8, wherein the coupling protrusion is connected to a side of the preformed seal delimiting the mold cavity.

12. The method according to claim 9, wherein the coupling protrusion and the second coupling protrusion are connected to one or more sides of the preformed seal delimiting the mold cavity.

13. The method of claim 1 and further comprising:
providing a second component at a second predetermined position relative to the substrate, at least a part of the second component being spaced at a distance from the substrate;
wherein arranging the mold, wherein the mold holds the second component at the second predetermined position and wherein the second component delimits the mold cavity;
wherein at least partially filling the mold cavity with the solidifiable composition comprises the solidifiable composition being in contact with the second component.

14. The method of claim 13 wherein in the second predetermined position the second component is spaced apart from the substrate.

15. The method of claim 13 wherein in the second predetermined position a portion of the second component is in contact with the substrate.

16. The method of claim 13 wherein the second component is spaced apart from the preformed seal.

* * * * *